United States Patent [19]

Berglund et al.

[11] 3,828,327

[45] Aug. 6, 1974

[54] SIMPLIFIED STORAGE PROTECTION AND ADDRESS TRANSLATION UNDER SYSTEM MODE CONTROL IN A DATA PROCESSING SYSTEM

[75] Inventors: Neil C. Berglund; John W. Kerr; Jerome U. Petrie, all of Rochester, N.Y.

[73] Assignee: International Business Machines Corporation, Armonk, N.Y.

[22] Filed: Apr. 30, 1973

[21] Appl. No.: 356,006

[52] U.S. Cl. .......... 340/172.5

[51] Int. Cl. .......... G06f 9/18, G06f 9/20

[58] Field of Search .......... 340/172.5

[56] References Cited

UNITED STATES PATENTS

| | | | |
|---|---|---|---|
| 3,292,151 | 12/1966 | Barnes et al. | 340/172.5 |
| 3,303,477 | 2/1967 | Voigt | 340/172.5 |
| 3,395,392 | 7/1968 | Kulikauskas | 340/172.5 |
| 3,398,405 | 8/1968 | Carlson et al. | 340/172.5 |
| 3,553,653 | 1/1971 | Krock | 340/172.5 |
| 3,614,740 | 10/1971 | Delagi et al. | 340/172.5 |
| 3,676,852 | 7/1972 | Abernathy et al. | 340/172.5 |
| 3,701,977 | 10/1972 | Mendelson et al. | 340/172.5 |
| 3,740,722 | 6/1973 | Greenberg et al. | 340/172.5 |
| 3,742,458 | 6/1973 | Inoue et al. | 340/172.5 |

*Primary Examiner*—Raulfe B. Zache
*Assistant Examiner*—John P. Vandenburg
*Attorney, Agent, or Firm*—Donald F. Voss

[57] ABSTRACT

Improved mode control is provided for a computer system whereby system mode can change for each asynchronously occurring interrupt. Mode control includes the functions of privileged instructions, masked interrupts, storage protection and address translation for expanded storage. Any combination of these functions can be active at any instant. Each interrupt level can select its own type of addressing control and with respect to any cycle of operation within the interrupt routine.

22 Claims, 9 Drawing Figures

SIMPLIFIED STORAGE PROTECTION AND ADDRESS TRANSLATION UNDER SYSTEM MODE CONTROL IN A DATA PROCESSING SYSTEM

BACKGROUND OF THE INVENTION

1. Field of the Invention

This invention relates to data processing apparatus and more particularly to such apparatus having improved mode control and still more particularly to such apparatus where the mode control is selectively changeable for particular operation cycles of the data processing apparatus.

The invention finds particular utility in expanded function computer systems. Many computer systems are originally designed with an architecture based upon meeting the needs of a particular segment of the market. Once the system has been accepted by the market place, a demand often arises for a computer system having more function. The problem then becomes one of expanding the function of an existing system using its basic architecture or designing an entirely new system. The present invention is directed to expanding the function of an existing computer system, but still using the basic architecture of the system.

2. Description of the Prior Art

The present invention provides expanded storage addressing, storage protection, privileged instruction; program check; and masked interrupt mode selection on an operational cycle basis. This capability enhances the ease of programming the computer system because each interrupt level within the system can select its own mode of operation. The interrupt routine can be located in a block of storage directly associated with the interrupt level calling that routine.

The prior art teaches the concept of having the active interrupt level select the appropriate address register but it does not teach selecting both the address register and the mode the system should be in for that interrupt level and permitting the mode to change within the active interrupt level selectively on an operational cycle basis.

The prior art also teaches expanded storage addressing such as in U.S. Pat. Nos. 3,292,151; 3,303,477; 3,395,392 and 3,553,653 but not in combination with storage protection as in the present invention.

SUMMARY OF THE INVENTION

The principal objects of the invention are to provide improved mode control for a computer system which:

1. enables the system mode to be changed on an operational cycle basis;
2. provides for expanded storage addressing with storage protection to facilitate multiprogramming within the computer system; and
3. expands the function of an existing computer system using the basic architecture of that system.

The foregoing objects are achieved by connecting into the system a plurality of program mode registers which are selected by the active interrupt level. Each program mode register includes settable bit positions which are connected to logic for controlling the mode of operation. A set of storage accessing control registers selected by a group of high order address bits are provided to expand the storage address and to specify the protected storage areas. The bits from a selected storage accessing control register are applied to logic which is also controlled by the outputs of the mode control logic.

BRIEF DESCRIPTION OF THE DRAWINGS

FIGS. 1*a* and 1*b* taken together as shown in FIG. 1 are a schematic block diagram illustrating the invention;

GENERAL DESCRIPTION

Figures 1, 1A:
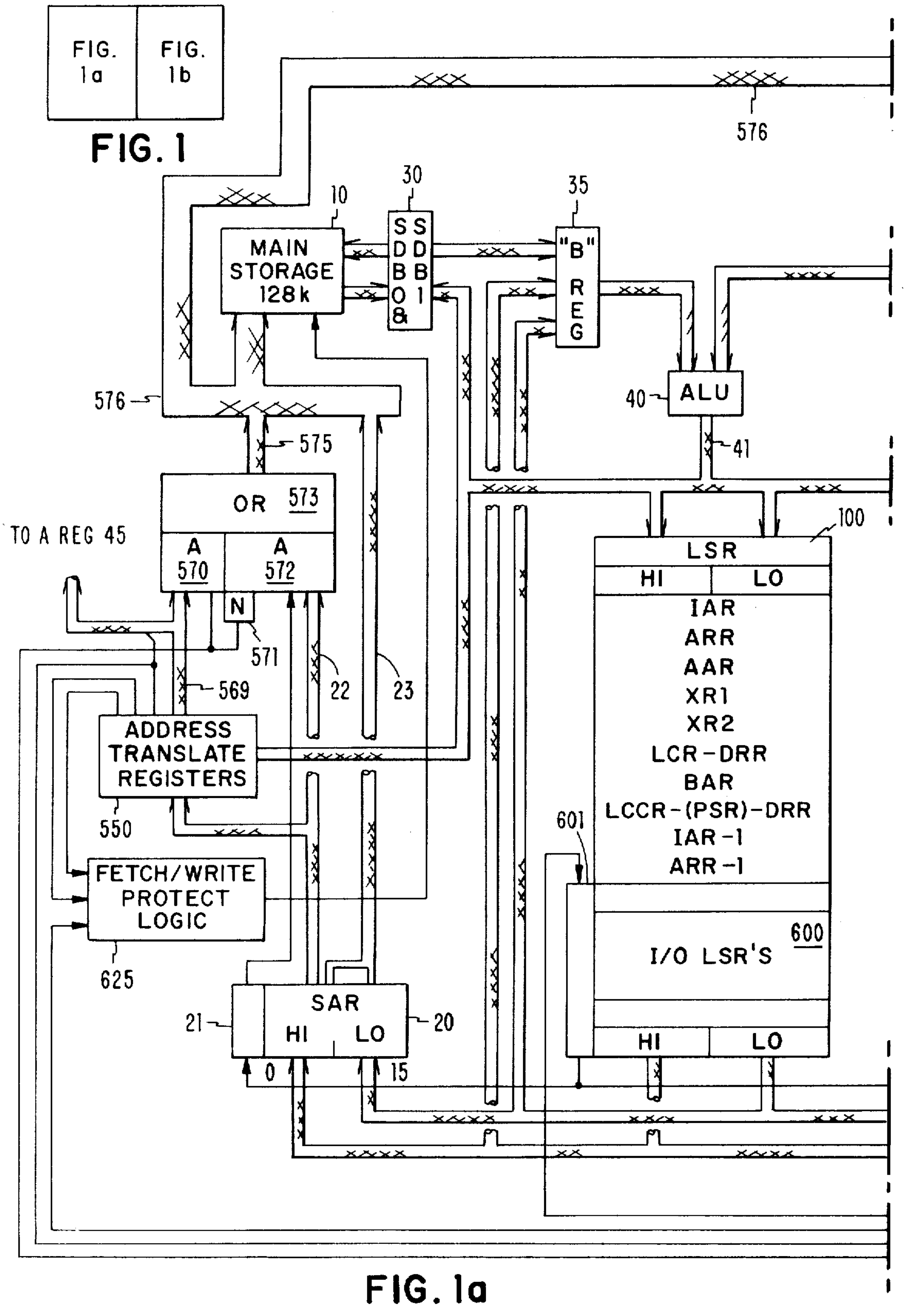
FIG. 1 is a block diagram illustrating how
FIGS. 1*a* and 1*b* are combined to represent the invention.
Figure 1B:
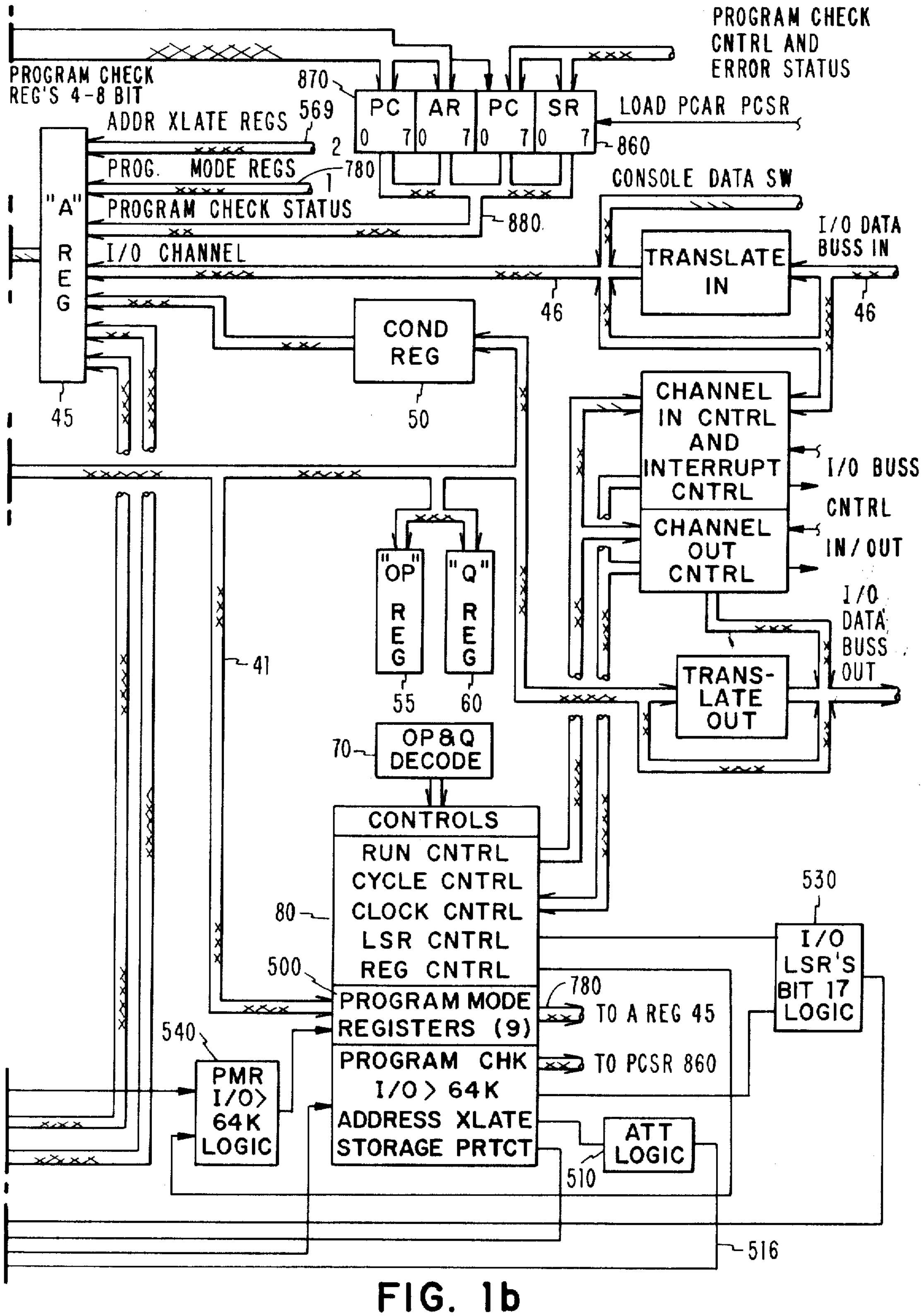

With reference to the drawings and particularly to FIG. 1, the invention is illustrated by way of example as being incorporated into a computer system of the type shown and described in manuals entitled IBM 5410 Processing Unit Theory of Operation, Copyrighted 1969, 1970, 1971 by International Business Machines Corporation (Form No. SY31-0207-2) and IBM 5410 Processing Unit Diagrams, Copyrighted 1969 by International Business Machines Corporation (Form No. SY31-0202-2) both of which are incorporated herein by reference. The invention enhances the data processing system of the type described in the aforementioned references by among other things, changing it into a multi-programming system. A multiprogramming system is basically a more versatile data processing system in that more than one user program can control the data processing operation where a supervisor program controls job switching. The main storage unit 10 in FIG. 1 has an expanded capacity and in this example can store 128K Bytes of data where a byte of data consists of eight bits (0–7). Storage unit 10 has sufficient capacity to store the supervisor program and to simultaneously store one or more user programs.

All byte positions in main storage 10 can no longer be discretely addressed by the address in the storage address register (SAR) 20 because the maximum address in register 20 and in registers 100 from where the address in register 20 originated can discretely address only one of 64K bytes. The supervisor program is stored in the lower K bytes, i.e., the first 16K bytes for example, and the user programs are stored in higher K bytes of storage. For example, one user program is stored in bytes 16–64K and another user program is stored in bytes 64–128K. The storage addressing mode i.e., low or high 64K bytes, is determined by control bits stored in program mode registers 500 which are selected by interrupt levels of the data processing system.

There are in essence nine interrupt levels and thus there are nine program mode registers 500. The ninth interrupt level is really the program level or no interrupt level. The program mode registers 500 are program loadable with data bits by means of a new instruction Load/Store Program Mode Registers. The contents of a program mode register can be changed at EB time of an instruction cycle. Each program mode register has seven bits and three bit positions of these seven bit positions are for controlling the addressing mode. These three bit positions of each register are shown for simplicity as being grouped together in FIG. 1 and feed address translate table logic block 510.

Expanded addressing takes place selectively by means of address translate table registers 550 which are also program loadable by using a new instruction called Load/Store Address Translation Table. There are thirty two address translate table registers and each register contains eight bits. Of these eight bits, six are used for providing high order address bits to main storage, the other two bits are used for designating whether or not the storage area being addressed is write or fetch protected.

From the foregoing it is seen that the program mode registers 500 are selected by the active interrupt level to determine the operating modes of the system and among others, the address translation mode. The address translation mode is active or inactive during various machine cycles of an instruction depending upon control bits in the selected program mode register 500. If, the address translation mode is active for one of the machine cycles (to be described later), the high order address bits are taken from an address translation table register 550 selected by bits 0–4 on bus 22 of the 16 bit logical address contained in SAR 20. The selected address translation table register 550 provides six high order address bits to main storage via bus 569 and AND circuit logic represented by AND circuit 570 (there would be a separate AND circuit for each address bit) and OR circuit 573. The AND circuits as represented by AND circuit 570 are conditioned by a Translate signal generated by Address Translation Table logic 510. The Translate signal is applied via conductor 516 to AND circuit 570 and inverter 571.

In the absence of a Translate conditioning signal, inverter 571 conditions AND circuits represented by AND circuit 572 to pass bits 0–4 of SAR 20 on bus 22 and bit 17 from the set output of a 17 position storage element 21 which has been added to SAR 20. This seventeenth bit position as will be described later is used only on I/O cycles. The remaining bits 5–15 in SAR 20 are applied directly to main storage via bus 23. By this arrangement, except for I/O devices which use cycle steals to transfer data, a 16 bit logical address can address 128K bytes of storage in that the five high order bits in SAR 20 are used to select one of the registers 550 which contains six address bits.

The I/O devices use a physical seventeen bit storage address. This is because the I/O devices do not use the address translation table registers 550. The reason for not using the address translation table registers 550 is that the supervisor program is changing the contents of these registers to another user when I/O operations are being executed for still a different user. Hence, the central processing unit CPU can do useful work for one user while another is waiting for an I/O device to complete its operation. As will be pointed out later herein, I/O buffers can cross the 64K boundary.

The I/O device LSR's 600 have been modified so each have 17 bits. The I/O LSR's 600 are loaded with 16 bits in the usual manner. The 17 bit is loaded during a LIO instruction used for loading the other 16 bits. The bit loaded in the seventeenth position depends upon the bit condition of the I/O > 64K bit in the selected PMR 500. The logic responsive to the LIO instruction and I/O > 64K bit in the selected PMR 500 is represented by block 530. This logic 530 also contains logic for setting the seventeenth bit in LSR's 600 to the proper state when the address for an I/O device crosses the 64K boundary. The seventeenth bit of an I/O LSR 600 can be stored in a selected PMR 500 by means of a sense (SNS) instruction issued to an I/O device LSR at the same time the other sixteen bits are being written in storage. The state of the seventeenth bit in the I/O device LSR is set into the selected PMR 500 under control of logic block 540. The bit stored in the selected PMR 500 can then be transferred to main storage 10 to facilitate inspection of the status of this bit.

The additional two bits in each address translation table register 550 are used for storage protection. Storage protection is provided so that user programs can be co-resident in main storage without the danger of one program destroying or changing the data of another program. The storage protection function provides fetch and write protection of the selected areas of main storage. The storage protection mode is determined by a bit position in the program mode registers 500. If the storage protection bit is a one in the selected or active program mode register 500, then the storage protection function is active, whereas if it is zero, the storage protection function is inactive. Whether or not an area in main storage is fetch or write protected is determined by the fetch and write protect bit conditions in the selected address translation table (ATT) register 550.

Since there are 32 ATT registers 550 storage is protected in 2K blocks. Further, only 64K storage positions are addressed at any one instant; hence, the other 64K is automatically protected. This is because there is no way to address the other 64K without changing the contents of the ATT register 550. Fetch protection prevents reading data from a particular location in main storage. If the fetch protection bit in the selected ATT register 550 is a one and the storage protection mode is active as determined by the storage protection bit in the active PMR register 500, fetch/write protect logic 625 generates a signal which inhibits transfer of data from register 30 to B register 35. Write protection prevents entering data in a particular location in main storage 10. Write protection takes place when the write protect bit in the selected ATT register 550 is a one and the storage protection mode is active. Fetch/write protect logic 625 is responsive to the conditions just mentioned and generates a signal for blocking the writing of data in main storage.

In addition to providing storage protection to facilitate multiprogramming, it is also necessary to have the supervisor program control job switching. In order to providing efficient multiprogramming, control of the central processing unit (CPU) is given to one user when another user which had been using the CPU is waiting for I/O. To provide the necessary control, no user program can issue its own I/O command. To insure this condition, all I/O commands are privileged commands and are issued by the "privileged" supervisor program. The user programs operate "unprivileged" to insure that they cannot issue I/O commands. Hence, the user programs require the services of the supervisor program for I/O and other privileged operations such as register commands. The privileged operation mode is determined by the privileged mode bit in the active PMR 500. When this bit is a binary one, all commands both privileged and unprivileged, can be executed. However, if this bit is a binary zero, the privileged commands are not executable. The Supervisor Call (SVC) instruction provides communication between the unprivileged user program and the privileged supervisor program. This instruction, when issued, causes the operation to switch into interrupt level 0. This interrupt level, which is the lowest priority interrupt level, brings an associated PMR 500 into active status. The privileged mode bit associated with interrupt level 0, PMR is always on. Therefore, the interrupt routine 0 which is part of the supervisor can issue all commands. Through this interrupt, an unprivileged user can communicate with the supervisor. The associated PMR 500 has bits which determine whether or not address translation is active. This, for example, can enable a user program located in the high 64K of storage to switch to the supervisor program which is located in the low 64K of storage without changing the contents of the address translation registers 550.

A Mask Interrupt mode is provided to prevent the supervisor program from being interrupted when it is setting up a switch between user programs. The Mask Interrupt mode is determined by a mask interrupt bit in the PMR's 500. When the mask interrupt bit is a one, higher priority interrupts are held pending until the mask interrupt bit is switched to zero.

The highest priority interrupt level is reserved for Program Check Interrupt or interrupt level 7. This interrupt level has been added to provide a way for preventing a total system stop when one user program has created errors such as invalid operation code, invalid storage addresses, invalid I/O device address, storage violations, and privileged command violations. Apparatus provides status information to indicate the source of the error and the address at which the error occurred. This enables the programmer to analyze the cause of the failure whereby appropriate action can be taken in the interrupt routine.

From the foregoing, it is seen that the present invention provides functions to facilitate a multiprogramming data processing system. Program mode registers having bits for controlling the system mode of operation with respect to address translation, privileged operations, I/O > 64K, storage protection and mask interrupts are selected by the active interrupt level or by special instructions Load/Store CPU. Address translation is operable on a cycle basis and address translation table registers selected by the high order bits of the logical address provide the high order bits for the physical address. The low order bits of the physical address are provided by the low order bits of the logical address.

A privileged mode of operation prevents one user from holding the system in a wait state where no useful work is being done and thus preventing efficient multiprogramming. A program controlled interrupt level provides communication between user programs and the supervisor program. A command CPU instruction is used to render the privileged mode interrupt level 0 active. The supervisor program handles all I/O commands and after starting an I/O device for one user it loads the address translation registers 550 to point to another user and gives control to that user to make maximum use of available CPU time. I/O devices do not use the address translation table but use a seventeen bit physical address contained in I/O device local storage registers 600. The seventeenth bit can be set into an I/O device local storage register by the I/O > 64K bit in the active program mode register.

Storage protection enables more than one user program to be simultaneously resident in main storage whereby other user programs are protected from being changed by the active user program. Program Check Interrupt or interrupt level 7 enables continued operation by other user programs when one user program has created errors which otherwise would have caused the system to stop operating.

DETAILED DESCRIPTION

The invention as illustrated in FIG. 1 is incorporated into an existing computer system using the basic architecture of the computer system. The existing computer system is of the type shown and described in IBM 5410 Processing Unit Theory of Operation SY3-0207-2 and IBM 5410 Processing Unit Diagrams SY31-0202-2 identified hereinafter as (Ref 1) and (Ref 2) respectively. The block diagram of FIG. 1 is a modified block diagram of the computer system shown on page 1–17 of Ref. 1. Except where necessary to complete the understanding of the present invention, the structure and operation of the computer system in Ref. 1 and Ref. 2 will not be described.

PROGRAM MODE REGISTERS (PMR'S)

Figure 2A:
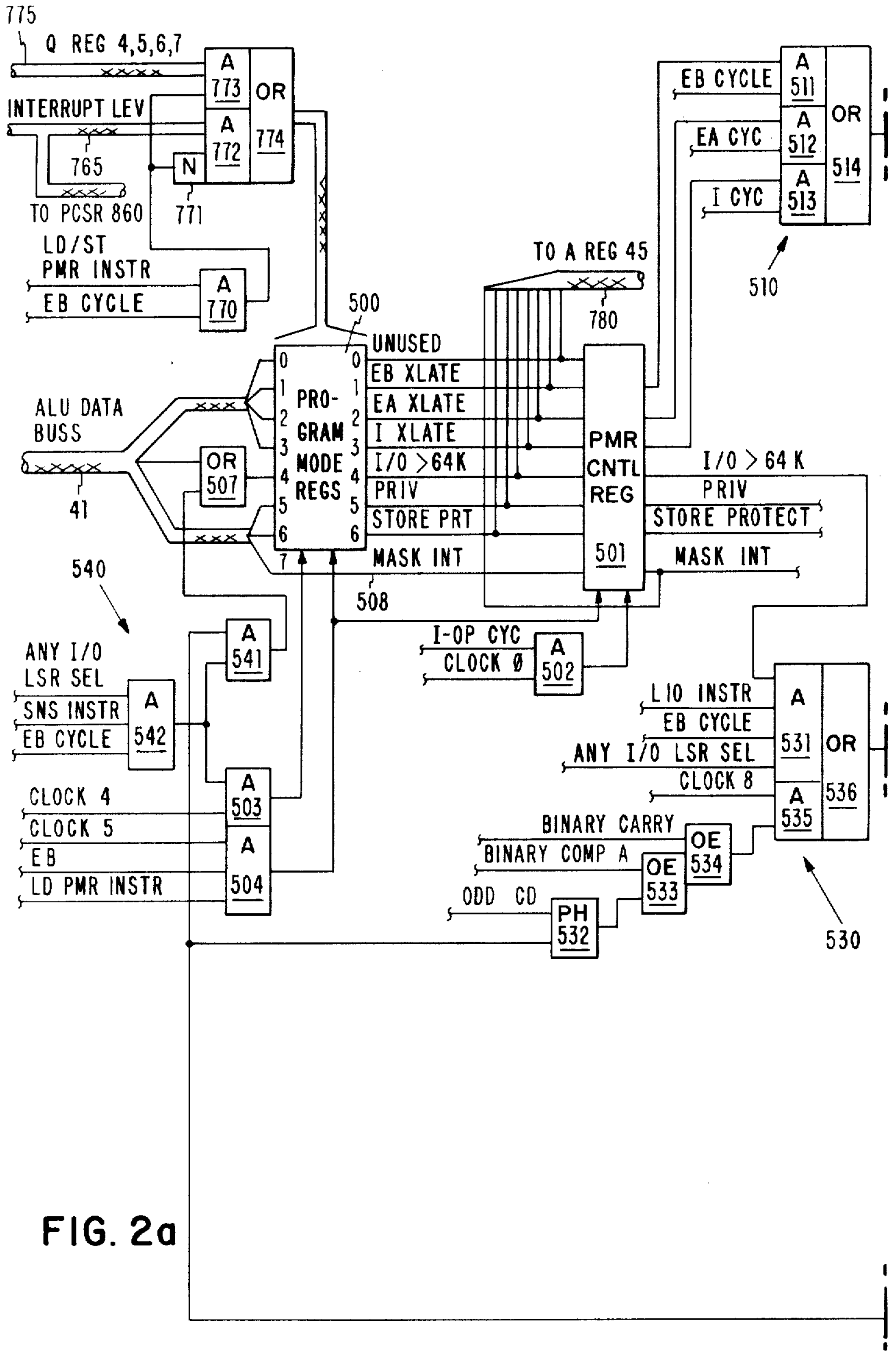
FIGS. 2*a* and 2*b* with FIG. 2*a* disposed to the left of FIG. 2*b* taken together are a schematic logic block diagram illustrating the logic for addressing, loading and storing the program mode registers, the logic for addressing, loading and storing the address translation table registers and the logic for setting and sensing the 17 bit in the I/O device local storage registers (LSR's)
Figure 2B:
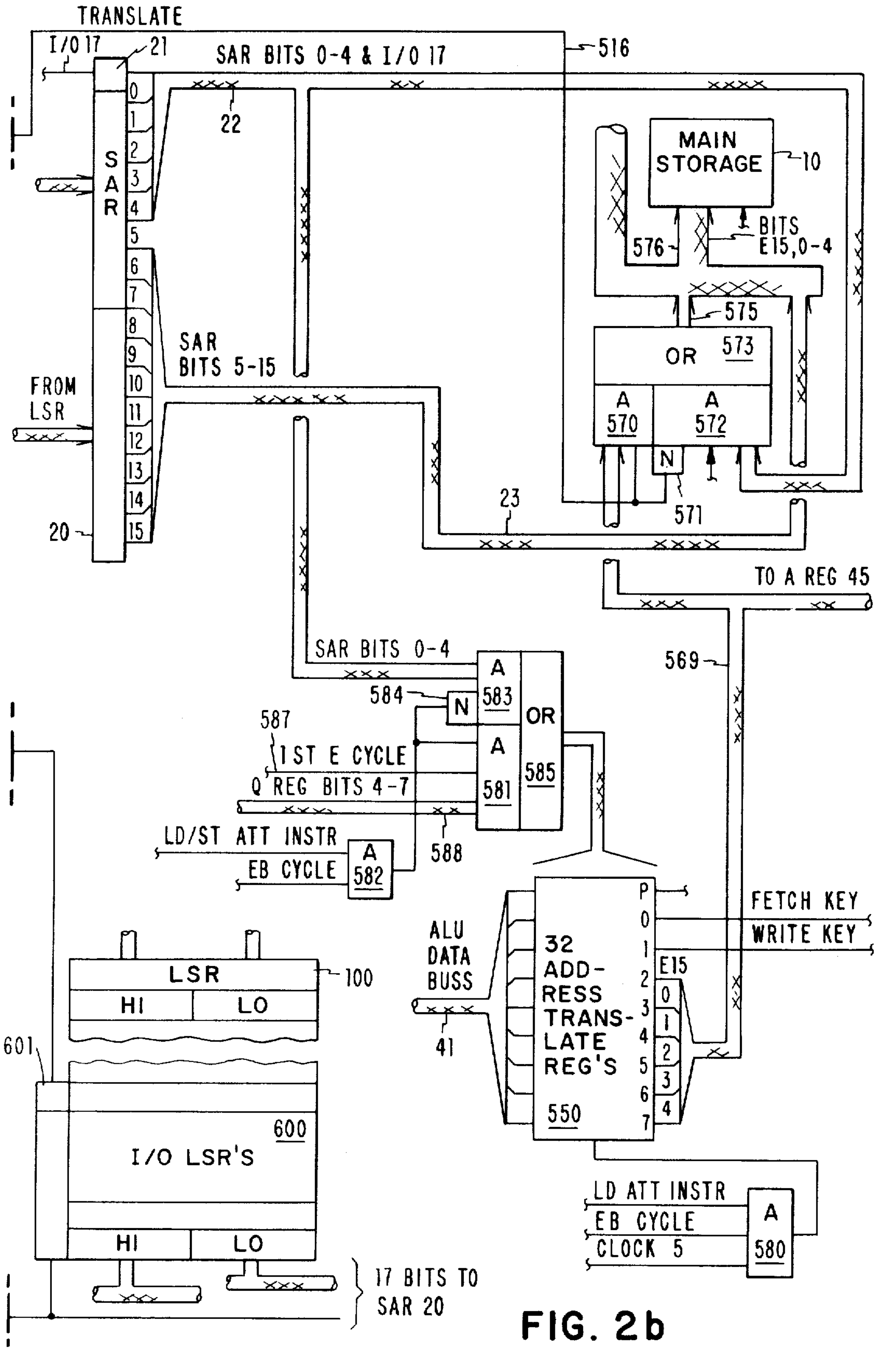

The program mode registers (PMR's) 500 are shown in FIG. 2 as conventional registers. There are nine PMR's, one for each interrupt level (0–7) and one for the non-interrupt or program level. Each PMR has seven bits. The zero bit position is unused and bit positions 1, 2 and 3 are used for address translation for EB, EA and I cycles respectively. EA and EB cycles are instruction execution cycles whereas I cycles are instruction fetch cycles as described on page 3-1 of Ref. 1. Thus address translation can take place on a cycle basis depending upon the bit conditions of bits 1, 2 and 3.

Bits 4, 5, and 6 are used for I/O > 64K, privileged mode, and storage protection respectively. The Mask Interrupt bit, which corresponds to bit 7, is not contained in the PMR's because of timing requirements. The contents of the PMR's can be changed at EB time of an instruction cycle; however, the contents of a PMR must be available from one I OP clock 0 time to the next I OP clock 0 time. Hence, a program mode control register 501 is provided as a buffer register and its inputs are connected to outputs of the PMR's 500 and to the conductor carrying the Mask Interrupt bit. Bits 1–6 of register 501 are loaded under control of AND circuit 502 which provides an output signal when an I OP cycle signal is simultaneously present with a clock 0 signal. Bit 7 of register 501 is loaded directly from the ALU bus 41 by AND 504 at the same time that PMR's 500 are loaded.

The PMR's 500, FIG. 2, are loaded with data bits from ALU bus 41. The data bits generally come from main storage 10 but the ALU 40 FIG. 1 is part of a common data path as explained in Ref. 1. It should be noted that bit 4, which is the I/O > 64K bit, is loaded via OR circuit 507. OR circuit 507 has a bit input from ALU bus 41 and a bit input from AND circuit 541. AND circuit 541 is gated by AND circuit 542 and functions to pass the bit condition represented by the seventeenth bit of the selected I/O device LSR 600. AND circuit 542 is conditioned by a SNS Instruction signal, an any I/O LSR SEL signal and an EB cycle signal. Although the data for loading the PMR's 500 comes from either the ALU bus 41 or the seventeenth bit of I/O device LSR's 600, the PMR's are loaded under control of AND circuits 503 and 504.

Figure 3:
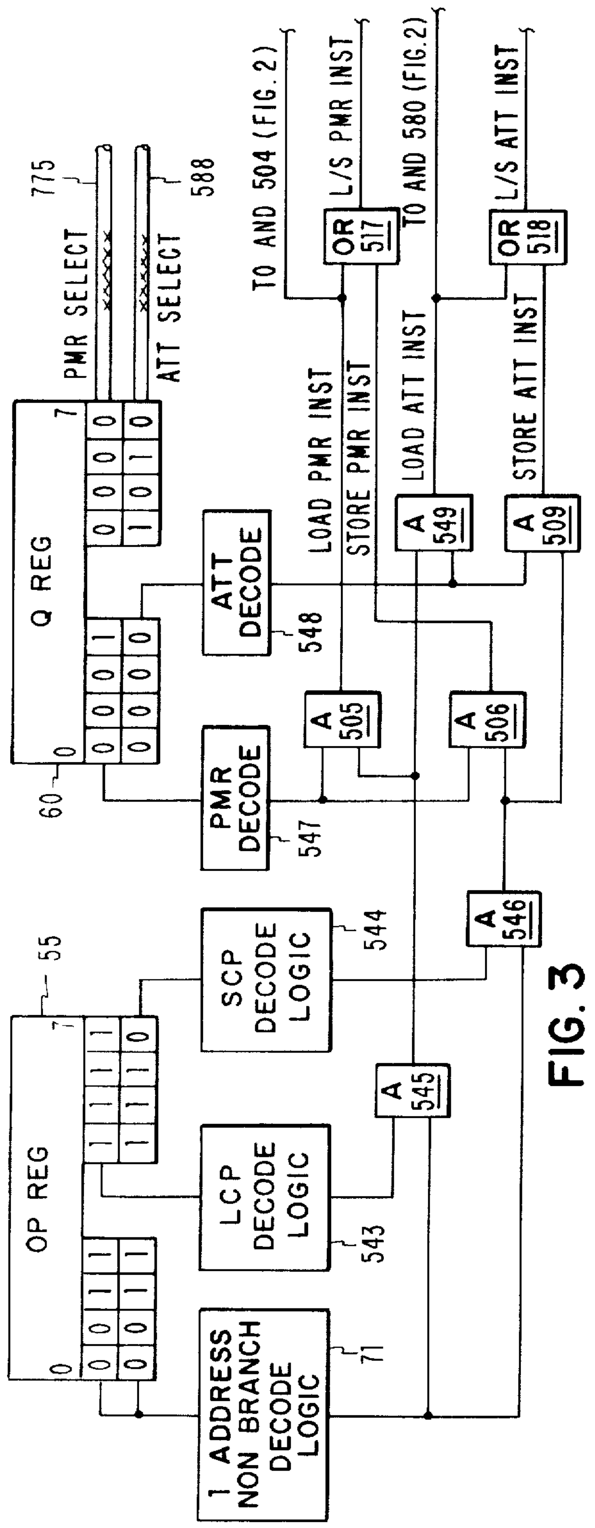
FIG. 3 is a schematic logic diagram illustrating logic for generating control signals used by the logic in FIG. 2 in response to Load and Store CPU instructions.

AND circuit 503 will provide a load signal at clock 4 time if there is an outut from AND circuit 542. This is the alternate way for loading bit 4 of the selected PMR 500. The normal way for loading a PMR 500 is by a Load CPU instruction. The particular meaning of a Load CPU instruction is dependent upon the Q code in the Q Reg 60. In FIG. 3, the operation code (OP code) of a Load CPU instruction is in OP Code Reg 55. The high order bits 0–4 are decoded by 1 Address Non-Branch Decode logic 71. The output of this logic conditions AND circuits 545 and 546. Load CPU decode logic 543 is responsive to bits 4–7 in OP Code Reg 55 having the proper configuration to provide a signal to AND circuit 545. AND circuit 545 passes a signal to AND circuit 505 which is conditioned by the output of PMR decode logic 547. This logic provides an output signal when the bits 0–3 in Q Reg 60 have the proper configuration. The output signal from AND circuit 505 is a Load PMR INST signal which is applied to AND circuit 504 FIG. 2. AND circuit 504 also has inputs for receiving a clock 5 signal and for receiving an EB signal.

Figure 6:
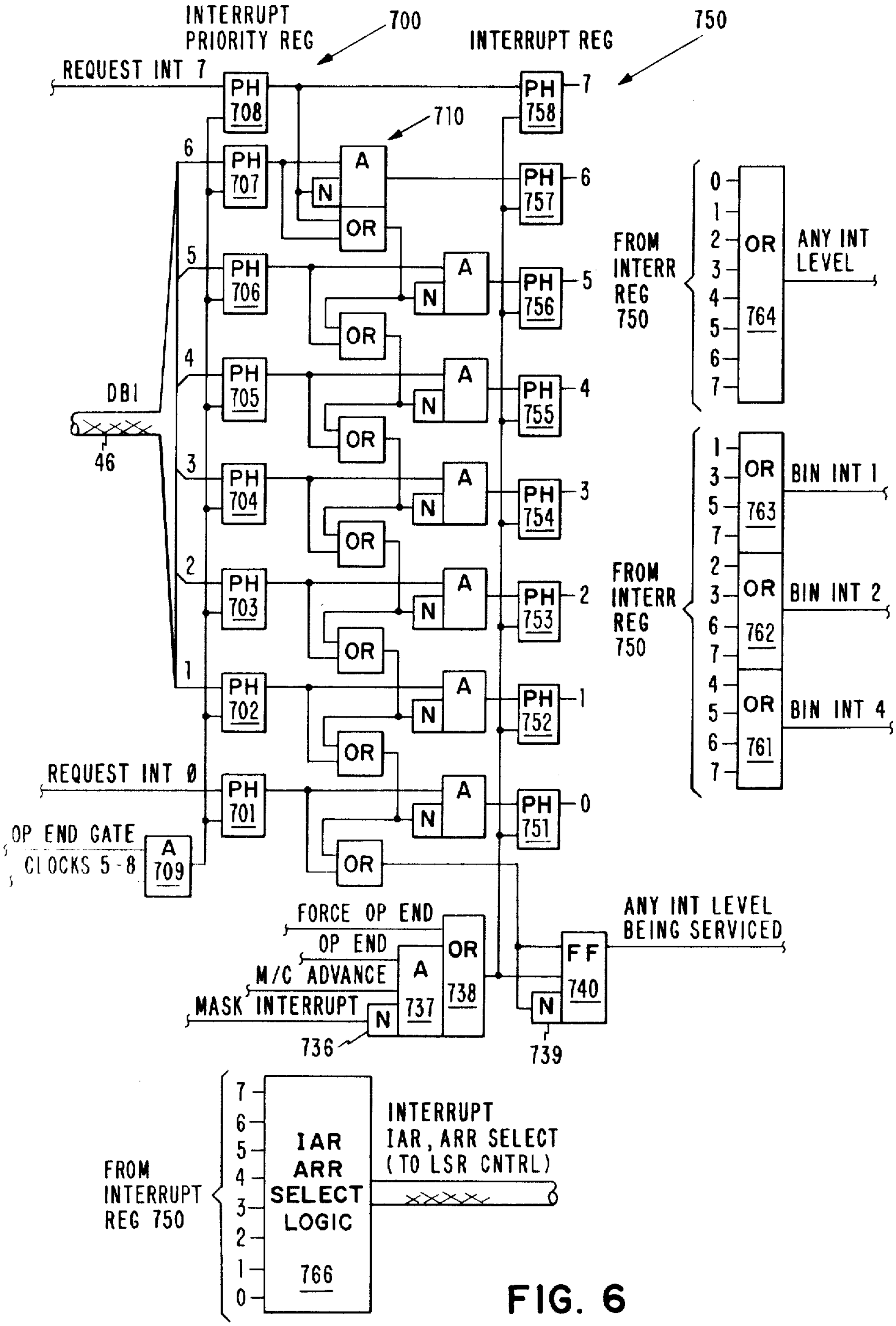
FIG. 6 is a schematic logic diagram illustrating the interrupt level logic.

The active PMR of the PMR's 500 is normally selected by the active interrupt level. The interrupt levels 0–7 are binary encoded as shown in FIG. 6. The interrupts 1–6 are the normal interrupts and as in Ref 1 they are shown as coming from bus 46. Interrupts 1–6 service a cathode ray tube display (CRT), BSCA, MLTA, SIOC, OP END and a timer, respectively. The interrupts are applied to polarity holds 702–707 respectively of Interrupt Priority register 700. Interrupt levels 0 and 7 which service the supervisor program and program check to be described later herein are applied to polarity holds 701 and 708 respectively. The polarity holds 701–708 are set under control of AND circuit 709 which receives an OP END GATE signal and a clock 5–8 signal.

Interrupt level 7 has the highest priority whereas interrupt level 0 has the lowest priority. The interrupt level priority logic is represented as logic 710 and functions in the manner indicated in Ref 1 and 2. The interrupt register 750 receives the interrupts from interrupt priority register 700 via the priority logic 710. The polarity holds 751–758 forming interrupt register 750 are set under control of OR circuit 738. OR circuit 738 receives a Force OP END signal and a signal from AND circuit 737. AND 737 receives an OP END signal, a M/C ADVANCE control signal and a signal from inverter 736. Inverter 736 has its input connected to the MASK INTERRUPT output of PMR control register 501. Thus a MASK INTERRUPT bit in register 501 will inhibit any new interrupt from being set into register 750.

The interrupt levels in interrupt register 750 are binary encoded by OR circuits 761, 762 and 763. OR circuit 764 provides an output signal whenever any interrupt level 0–7 is active. The outputs of OR circuits 761, 762, 763 and 764, as will be explained shortly, are used to select the active PMR 500. However, in addition to the interrupt circuitry already described, it should be noted that the ANY Int Level Being Serviced signal is provided by latch 740. Latch 740 has gating inputs from priority logic 710 and with the reset input being connected via interter 739. Latch 740 also has an input from OR circuit 738. It should also be noted that the IAR and ARR select logic 766 is responsive to interrupt level inputs from register 750 and generates control signals which are applied to LSR selection control logic 80, FIG. 1.

The binary encoded interrupt levels, i.e., the outputs of OR circuits 761, 762, 763 and 764, FIG. 6, are shown as being applied by bus 765, FIG. 2, to a number of AND circuits (one for each binary input) represented by AND circuit 772 to select one of the PMR's 500 via OR circuit 774. These AND circuits are conditioned via interter 771 by the absence of a signal from AND circuit 770 which occurs when a LD/ST PMR INST signal is absent. The LS/ST PMR INST signal provides the alternate way for selecting the active PMR. The bits for selecting a PMR 500 with a LD/ST PMR INST signal come from Q Reg 60, FIG. 3. These bits 4–7 from Q Reg 60 are applied via bus 775 to a corresponding number of AND circuits represented by AND circuit 773, FIG. 2. This AND circuit is conditioned by the output of AND circuit 770 which receives the LD/ST PMR INST signal and the EB signal. The LD/ST PMR INST signal comes from OR circuit 517 FIG. 3.

OR circuit 517 has inputs from AND circuits 505 and 506. AND circuit 505 has been previously described and its output is the LOAD PMR INST signal. The output of AND circuit 506 is a Store PMR Inst signal in response to inputs from PMR decode 547 and from AND circuit 546. The outputs of 1 Address Non-Branch Decode logic 71 and SCP (Store CPU) decode logic 544 are applied to AND circuit 546. Thus a Store CPU or Load CPU instruction will cause a L/S PMR INST to be generated when the Q code of the instruction is such that PMR decode 547 has an output signal.

A selected PMR 500 is loaded into main storage 10 by means of a Store CPU instruction having the proper Q code. The contents of the selected PMR together with the Mask Interrupt bit from the PMR control register 501 is entered into A Register 45, FIG. 1, via bus 780. The data in A Register 45 is then transferred to main storage 10 via ALU 40 and storage data register 30.

ADDRESS TRANSLATION

Address translation provides for an expanded storage address. The computer system of FIG. 1 has a normal data path which is one byte wide and an address path which is two bytes wide. Data is transferred within the computer system one byte at a time. However, several successive storage accesses may be taken to complete an operation. As set forth in Ref 1, the storage address register SAR 20, FIG. 1, is loaded two bytes at a time from one of the LSR's 100 during the first functional time of a machine cycle. Of course during I/O cycles, the I/O device attachment provides the selection of the LSR 600 assigned as its address register.

SAR 20 is thus normally provided with a sixteen bit address which can discretely address one of 64K bytes in main storage 10. In order to address one of 128K bytes, a 17 bit address is required. Although a 17 position 21 is added to SAR 20 to facilitate a 17 bit address from an I/O device LSR 600, except for I/O device addresses, SAR 20 is loaded with two bytes or 16 bits from one of the CPU 16 bit general registers 100. This two byte address is then expanded or not into a 17 bit address depending upon the address translation control bits in the active PMR 500.

The address translation logic 510 in FIG. 1 includes AND circuits 511, 512 and 513, FIG. 2. These AND circuits 511, 512 and 513 are connected to outputs of PMR Control register 501 for the bit positions EB XLATE, EA XLATE and I XLATE respectively and are gated by control signals EB cycle, EA Cycle and I Cycle respectively. The outputs of these AND circuits are connected to OR circuit 514 and when a signal appears at its output on conductor 516 it is a TRANSLATE signal. Conductor 516 is connected to AND circuit 570 and inverter 571. Hence, if a TRANSLATE signal is on conductor 516 AND circuit 570 is conditioned and AND circuit 572 connected to inverter 571 is not conditioned.

AND circuit 570 is representative of five AND circuits having inputs connected to the bit positions E15, 0, 1, 2, 3 and 4 of address translation table (ATT) registers 550. The address translation table registers 550 are conventional eight bit registers (nine with the parity bit P) where six of the bits E15, 0, 1, 2, 3 and 4 are high order address bits and the remaining two bits are fetch key and write key bits.

There are 32 address translation table registers 550 which are loaded with data from main storage 10 via ALU bus 41 under control of a signal from AND circuit 580. AND circuit 580 is connected to receive a LD ATT INST signal, an EB Cycle signal and a clock 5 signal. The LD ATT INST signal comes from AND circuit 549 of FIG. 3. Hence, the address translation table registers 550 are loaded with data by a Load CPU instruction, and more particularly, one having an OP Code of hexidecimal 3F and a Q Code of hexidecimal O"X" where "X" is any hexidecimal number from 0 to F. The high order bits 0–3 of the Q code, i.e., 0000 indicate that the operation is for address translation and the register to be loaded is selected by the low order Q bits 4–7 plus a bit which is generated by the 1ST E cycle signal occurring during an instruction cycle and transmitted via conductor 587. The low order Q bits and IST E cycle signal are applied via bus 588 and conductor 587, respectively to five AND circuits as represented by AND circuit 581. These AND circuits are conditioned by a signal from AND circuit 582 to select address translation table registers 550 via OR circuit 585. AND circuit 582 has inputs connected to receive a LD/ST ATT INST signal from OR circuit 518 FIG. 3 and an EB cycle signal from controls 80 FIG. 1.

Usually the address translation table registers 550 are selected by the high order bits 0–4 of the address in SAR 20, FIG. 2. These bits are applied via bus 22 to a corresponding number of AND circuits represented by AND circuit 583. These AND circuits 583 are conditioned by a signal from inverter 584. Hence, in the absence of an output from AND circuit 582, AND circuits 583 are conditioned to select one of the address translation table registers 550. The address bits E15, 0, 1, 2, 3 and 4 in the selected address translation table register 550 are applied via bus 569 to a corresponding number of AND circuits represented by AND circuit 570. AND circuits 570 are conditioned by the TRANSLATE signal on conductor 516 from OR circuit 514.

It is thus seen that the high order bits of an expanded address come from an address translation table register 550. The low order bits 5–15 of the expanded address are applied directly to main storage address register 575 from SAR 20 via bus 23.

If the TRANSLATE signal is not present, the high order bits of the address, i.e., 0–4 and the 17 bit position 21 are applied via bus 22 to AND circuits 572 which will be conditioned by the output of inverter 571.

The contents of a selected ATT register 550 can be stored in main storage 10 by means of a Store CPU instruction. The Store CPU instruction for storing the contents of an ATT register 550 has an OP Code of hexidecimal 3E, FIG. 3, and a Q code of O"X" where "X" is a hexidecimal number of 0 to F. The "X" portion of the Q code is used to select the pair of ATT registers 550 which are to be stored. The selection takes place via AND circuits 581 under control of AND circuit 582, FIG. 2. The Store CPU instruction causes the signal LD/ST ATT INST to be passed by OR circuit 518, FIG. 3, in response to AND circuit 509 passing the STORE ATT INST signal. The contents of the selected pair of ATT registers 550 are passed on two successive cycles to main storage via the A register 45, ALU 40 and storage data register 30.

I/O > 64K

I/O devices forming part of the computer system transfer data and some commands to the system via I/O Data Bus In 46, FIG. 1. The interrupt requests as previously mentioned are transmitted by the I/O devices via Data Bus In 46. Additionally, data on Data Bus In 46 is entered into A Register 45, and for example, can be transferred via ALU 40 to main storage 10. I/O devices use device LSR's 600 for holding main storage addresses for storage references.

I/O devices are given capability of addressing the full 128K bytes in main storage 10 by adding a 17th bit position 601 to the I/O device LSR's 600. This 17th bit position is set by an I/O < 64K bit in PMR's 500. The I/O > 64K bit position in PMR Control register 501 is connected to an input of AND circuit 531, FIG. 2 of the I/O LSR's Bit 17 logic 530. This AND circuit also has inputs for receiving an LIO INSTR signal, an EB Cycle signal, and an Any I/O LSR SEL signal. Hence, when all of the input conditions to AND circuit 531 have been met, position 601 of a device LSR 600 will be set via OR circuit 536 to a one or zero condition depending upon the bit condition in the I/O > 64K bit position of register 501.

Position 601 of a I/O device LSR 600 is also set when the address for an I/O device crosses a 64K boundary during address incrementing of the I/O device LSR. The crossing of the 64K boundary is detected by applying the output of position 601 to polarity hold 532 which is set or strobed by an odd CD signal. The output of the polarity hold 532 is applied to Exclusive OR circuit 533 together with a Binary Comp A control signal from control 80. The output of Exclusive OR circuit 533 feeds Exclusive OR circuit 534 which also receives a Binary Carry signal. The output of Exclusive OR circuit 534 connects to AND circuit 535 which is conditioned by a clock 8 signal. Exclusive OR circuits 533 and 534 function as a one bit ALU which is responsive to carries out of the high order position to set position 601 via AND 535 and OR circuit 536 to a bit condition opposite to the bit condition that it was in prior to address incrementing. Hence, the storage address can cross the 64K boundary in either direction.

The bit condition in position 601 of an I/O device LSR can be set into a PMR 500 by means of a Sense instruction SNS. When a SNS instruction is given, a SNS INST signal is applied to AND circuit 542, FIG. 2, which also has inputs for receiving an Any I/O LSR Sel signal and an EB cycle signal. The output of AND circuit 542 is applied to AND circuits 503 and 541. AND circuit 503 controls the loading of PMR's 500 whereas AND circuit 541 controls the entry of data into the bit 4 position of the selected PMR 500. AND circuit 503 is gated by a clock 4 signal. AND circuit 542 provides the gating signal for AND circuit 541 and the signal to be passed comes from position 601 of a selected I/O device LSR. The signal passed by AND circuit 541 enters bit position 4 of the selected PMR 500 via OR circuit 507. The contents of the selected PMR can then be entered into storage 10 by means of a Store CPU instruction having OP and Q codes for storing PMR's, i.e., hexidecimal 3E 1 "X" where "X" is any hexidecimal number 0 or 8-F.

The status of the stored PMR contents can then be analyzed by additional instructions for performing logical operations in a well known manner. It should be noted that two separate instructions are required to load and store the 17th bit of an I/O device LSR and, hence, an interrupt can occur between the two instructions. This, however, does not create any problems because each interrupt level selects its associated PMR 500 via AND circuits 772 and OR circuit 774, FIG. 2. Thus, if an interrupt occurs after a Sense instruction and before the contents of the active PMR 500 has been stored in main storage 10, no other interrupt will destroy or change the contents of the PMR to be stored because the interrupt selects its own PMR 500.

PRIVILEGED MODE

Privileged mode operation is used to insure efficient multiprogramming of the computer system. In order to make maximum use of CPU time, when one user program is waiting for I/O completion, use of the CPU will be given to another user program. To operate in this manner, the supervisor must issue I/O commands so a user program cannot issue I/O commands which would place the operation in a wait state waiting for the I/O operation to complete. Privilege mode insures that no user can issue I/O commands by making I/O commands non-executable while the user program has control.

The privileged mode of operation is in effect when the active program mode register PMR 500 and consequently register 501 has a one bit in bit position 5 of the register. When operating in the privileged mode, all instructions are executable. All I/O commands are privileged because they can only be executed in the privileged mode. The supervisor program operates in the privileged mode and the unprivileged user programs require the supervisor to issue I/O commands. The user program communicates its requests for services to the supervisor with a Command CPU instruction having an OP Code of hexidecimal F4 and a Q code of hexidecimal 10 which results in a Supervisor Call instruction SVC. A SVC instruction causes the system to switch to interrupt level 0 which is always privileged. The interrupt level 0 routine is part of the supervisor and can handle user requests because it is privileged. The high order four bits and the low order four bits of the hexidecimal OP Code F4 are decoded by command format logic 800 and CCP decode logic 810, respectively, FIG. 5, to provide output signals to AND circuit 815. AND circuit 815 also has an input from $\phi$ Decode logic 820 which provides an output signal when the low order four bits of the Q code in Q register 60 are all zero.

The output of AND circuit 815 is indicative of a Command CPU instruction CCP and it is applied to AND circuits 823 and 824. AND circuit 824 provides a SVC INST output signal when SVC Decode 822 detects that the high order four bits of the Q code are 0001. The SVC INST signal is applied to AND circuit 830 FIG. 4 together with an IR signal and a clock 5 signal. The output of AND circuit 830 provides one input to AND circuit 833 which controls the setting of request interrupt 0 latch 834. The other input to AND circuit 833 is from inverter 831 which inverts the bit 6 output of the ALU bus 41. The reset of latch 834 is controlled by AND circuit 832 which has inputs from AND circuit 830 and from bit 6 of ALU bus 41. The output of the request interrupt 0 latch 834 is connected to polarity hold 701 of the interrupt priority register 700, FIG. 6.

It is thus seen that a Command CPU instruction having a Q code which is indicative of a Supervisor Call instruction SVC activates the interrupt level 0 provided the R code during the IR cycle has a zero bit for bit 6. This interrupt level then selects its associated PMR 500 in the manner described above. The selected PMR 500 has its own bit conditions for address translation, I/O>64K, privileged mode, storage protection and masked interrupt. Interrupt level 0 is reset by providing an R code so that ALU bit 6 is a one during the IR cycle. The R code is part of the instruction coming from main storage 10 and passes through the ALU 40 after it has been fetched from storage 10. Hence, it is available for assisting in the setting and resetting of latch 834.

Figure 5:
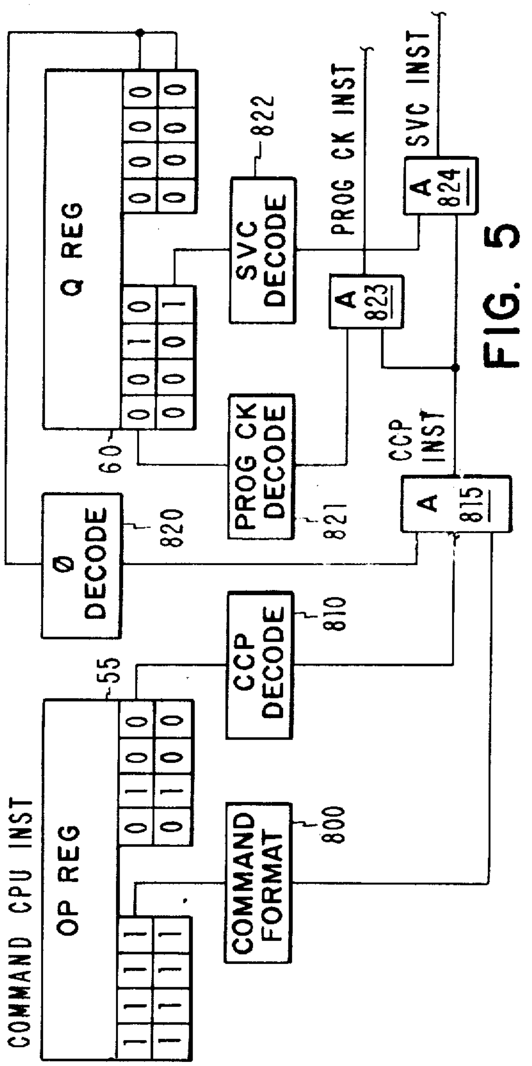
FIG. 5 is a schematic logic diagram illustrating logic for generating control signals used by logic in FIG. 4 in response to Command CPU instructions.

The Program Check interrupt function is used to insure efficient multi-programming of the computer system. If one user makes an error, the total system must not be stopped, but control is passed to another user. Program Check interrupt level 7 is also controlled by a Command CPU instruction where the high order bits of the Q code are 0010 as shown in FIG. 5. The program check decode logic 821 is responsive to those bit conditions and provides a signal to AND circuit 823 which is conditioned by the CCP INST from AND circuit 815. AND circuit 823 provides a PROG CK INST output signal which is applied to AND circuit 850, FIG. 4, for controlling the reset of request interrupt 7 latch 851. AND circuit 850 also has inputs for receiving an IR cycle signal, a clock 5 signal and a signal from bit 6 of the ALU bus 41. Although ALU bit 6 is also used for controlling the reset of request interrupt 0 latch 834, there is no conflict because the particular Command CPU instruction, i.e., SVC INST or PROG CK INST, controls whether latch 834 or latch 851 is reset.

Latch 851 is set at clock 8 time under control of AND circuit 849. AND circuit 849 is fed by OR circuit 845 which receives signals representing invalid conditions or errors which invoke a program check interrupt. Latch 851, when set, activates interrupt level 7 in that its set output is connected to polarity hold 708 of the interrupt priority register 700, FIG. 6. Interrupt level 7 is the highest priority interrupt and takes precedence over all other interrupts.

The invalid or error conditions for activating the program check interrupt level 7 are detected by AND circuits 843, 844, 846, 847 and decode logic 848. AND circuit 843 passes a signal, when conditioned by I OP cycle, which is indicative of an invalid OP Code as detected by decode logic 840. Decode 840 is also responsive to OP Codes indicative of privileged instructions to provide a signal to AND circuit 842. AND circuit 842 will provide an output signal to AND circuit 844 if the privileged mode bit in the active PMR 500 is a zero. Inverter 841 inverts the zero privileged mode bit of the active PMR 500 to condition AND circuit 842. AND circuit 844 is gated by the I-OP cycle signal.

Decode 840 also provides a store data group signal to AND circuit 847 which passes a write violation signal to OR circuit 845 and to the circuitry for inhibiting the writing of new data in main storage 10 as set forth in Ref 2. AND circuit 847 also has inputs for receiving the storage protect mode bit from the active PMR 500 via PMR control register 501, not I/O cycle signal, an EB Cycle signal and the write protect bit signal from the selected address translation table register 550.

Fetch violations are detected by AND circuit 846 which has inputs from the storage protect mode bit position of the active PMR 500 via PMR control register 501, the fetch protect bit position of the selected address translation table register 550, and the not I/O cycle signal. The fetch violation signal passed by AND circuit 846 in addition to being applied to OR circuit 845 is also used to block access to the addressed storage position in main storage 10.

An invalid address condition is detected by decode logic 848 which passes the invalid address signal to OR circuit 845. Decode circuit 848 is responsive to bits on bus 576 and a storage size signal to develop the invalid address signal. The invalid address condition and the invalid OP code program check are presently available in the computer system of Ref 1, although in that system they do not cause a program check but bring the system to a hard stop.

It should also be noted that the set output of latch 851 is applied to AND circuit 852 to force an OP end signal at clock 0 time with a M/C Advance signal. The forced OP end signal is applied to OR circuit 738 of FIG. 6 to insure that interrupt level 7 cannot be masked off by the Mask Interrupt bit.

The set output of latch 851 is also used to control the loading of the program check address register 870 and the program check status register 860, FIG. 1. The program check address register 870 is loaded, when latch 851 is set, with the lower 16 bits of the 17 bits on bus 576. The 17th bit of the main storage address on bus 576 is put into the program check register 860 along with program check control and error status bits which come from AND circuits 843, 844, 846, 847 and decode logic 848, FIG. 4. The contents of program check status register 860 and program check address register 870 can be stored in main storage 10 via bus 880, A Reg 45, ALU 40 and storage data register 30. After the contents of these registers have been stored, program routines can be used to examine the bit conditions of the stored data.

From the foregoing it is seen that a Command CPU instruction having an OP code of hexidecimal F4 and a Q Code of hexidecimal 10 switches the operation into interrupt level 0 to permit the supervisor program to take control. The switching into and out of interrupt level 0 is determined by the R Code during the IR cycle. A Command CPU instruction having a hexidecimal OP code F4 and a hexidecimal Q code of 20 is used to switch the operation out of interrupt level 7. Interrupt level 7 is active whenever a program check occurs. When a program check does occur, the current address for main storage on bus 576 is stored in program check address register 870 and status information is stored in program check status register 860. This information is then stored in main storage 10 so that it can be analyzed by the program. The operation of the computer system continues by issuing a Command CPU instruction to switch out of interrupt level 7.

STORAGE PROTECTION

Storage protection is used to prevent one user program from changing or destroying the contents of another user program or the supervisor program. Whether or not storage protection is in effect is determined by the condition of bit 6 in the PMR's 500. If this bit of the active PMR 500 is a one storage protection is effective. Whether or not an area in storage 10 is protected is determined by bits 0 and 1 in the selected address translation table register 550. Bit 0 is the fetch protect key, which, if in the storage protection mode prevents reading data from storage 10. Bit 1 is the write protect key and it prevents data from being written in storage 10 when in the storage protection mode.

Figure 4:
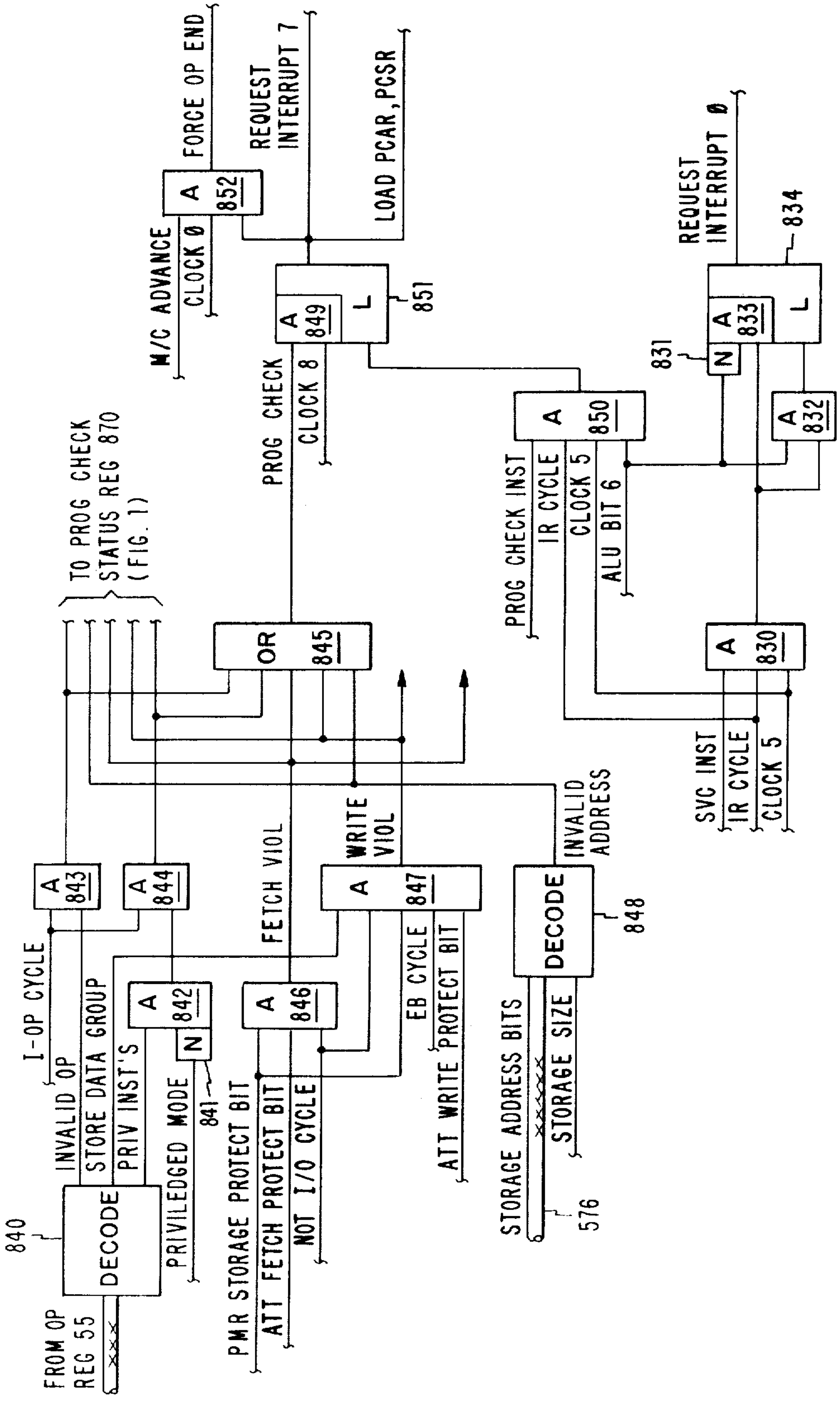
FIG. 4 is a schematic logic block diagram of the logic for detecting program check conditions, the logic for forcing operation end, logic for blocking access to and writing into data storage and logic for requesting interrupt levels zero and seven.

The fetch protection signal is developed by AND circuit 846, FIG. 4. It has inputs for receiving the storage protection signal from the active PMR 500 via PMR control register 501, the fetch protect bit signal from the selected address translation table register 550, and a not I/O cycle signal from control 80. The output of AND circuit 846 is a fetch violation signal and it is used to block access to storage 10 by controlling the SDR XFER signal in Ref 2. The write protect or write violation signal is developed by AND circuit 847. It has inputs from decode 840, the storage protect bit position of register 501, the write protect bit position of the selected address translation table register 550, the EB cycle signal and the not I/O cycle signal. The output of AND circuit 847 is used to block writing data into storage 10 by controlling the Store Data GRP signal in Ref 2.

MASK INTERRUPT

In some instances, it is necessary to hold off a higher priority interrupt, except for the highest priority interrupt level 7. For example, the supervisor program uses the lowest interrupt level and there are times when it is necessary for the supervisor program to have control without being interrupted except for program check. The masked interrupt mode is controlled by bit 7 of the program mode control register 501, FIG. 2, which for this bit position is directly loaded from the ALU bus 41. The reason for loading bit 7 of register 501 directly from ALU bus 41 is to avoid register delay time for loading PMR control register 501. If an interrupt is to be masked off, the mask must be active before the beginning of an I OP cycle; otherwise an interrupt could occur. Bits 1–6 of register 501 are loaded at clock 0 of I OP cycle which is too late to mask interrupts. The mask interrupt bit is loaded directly in PMR control register 501 and is thus available from EB clock 5 time until EB clock 5 time time of a Load PMR instruction which sets bit 7 off. The mask interrupt bit is applied to inverter 736, FIG. 6, to inhibit AND circuit 737. This prevents the status of polarity holds 751–758 from being changed and thus the operation remains in the current or active interrupt level. Of course, if the mask interrupt bit is a zero, AND circuit 737 is conditioned by inverter 736 and higher priority interrupts can switch the status of polarity holds 751–758.

We claim:

1. In a stored program computer system having addressable main storage means, central processing means, and input/output means, said central processing means including addressing means for addressing a portion of and all of said main storage means, means for fetching and storing data from and within said main storage means, means for arithmetically and logically processing data, means for initiating communication between said main storage means and said input/output means and control means for sequencing operations, said control means including interrupt levels ordered from low to high priority with only one interrupt level being active at anyone time, said interrupt levels being selected by logic within said central processing unit and within said input/output means, the improvement comprising:

a plurality of selectable program mode registers containing bits for controlling the operational mode of said computer system, there being one program mode register for each interrupt level, and program mode register selection means responsive to the selected interrupt level for selecting the program mode register for that interrupt level.

2. The stored program computer system of claim 1, wherein said interrupt levels are encoded in binary form.

3. The stored program computer system of claim 1, wherein each program mode register includes a bit position settable to a binary one or zero for representing the presence or absence of an address translation mode.

4. The stored program computer system of claim 3, wherein said address translation mode is for address translation during the I cycle time of an instruction cycle.

5. The stored program computer system of claim 3, wherein said address translation mode is for address translation during a first execution cycle of an instruction cycle.

6. The stored program computer system of claim 3, wherein said address translation mode is for address translation during a second execution cycle of an instruction cycle.

7. The stored program computer system of claim 1, wherein each program mode register includes a binary bit position settable to a binary one or zero for representing the presence or absence of a privileged operation mode.

8. The stored program computer system of claim 1, wherein each program mode register includes a bit position settable to a binary one or zero for representing the presence or absence of an input/output mode where said input/output means requires storage access beyond said portion of said main storage means.

9. The stored program computer system of claim 8 further comprising input/output address registers having a plurality of bit positions settable by bits from said input/output means for addressing said portion of said main storage means and a high order bit position for expanding the addresses in said input/output address registers beyond said portion of said main storage means; and logic means responsive to said input/output mode for setting said high order bit of said input/output registers.

10. The stored program computer system of claim 9, further comprising logic means for sensing the bit condition of said high order bit position of an input/output register and setting the input/output mode bit position of the selected program mode register to the bit condition sensed by said logic means.

11. The stored program computer system of claim 1 wherein each program mode register includes a bit position settable to binary one or zero for representing the presence or absence of a storage protection mode.

12. The stored program computer of claim 11 further comprising register means for storing sets of fetch and write protection bits for sets of storage areas within said main storage means, said sets of fetch and write protection bits being selected by a portion of the address for addressing said main storage means, and logic means responsive to a selected set of fetch and write protection bits and to said storage protection mode bit being a binary one for generating signals for blocking access to and writing into said main storage means.

13. The stored program computer system of claim 12, wherein said signals generated by said logic means are used to indicate fetch and write violation conditions.

14. The stored program computer system of claim 1 wherein each program mode register includes a bit position settable to a binary one or zero for representing the presence or absence of a masked interrupt mode.

15. The stored program computer system of claim 14, further comprising logic means responsive to the presence of a masked interrupt mode for generating a signal to inhibit selection of an interrupt level whereby the operation of the computer system continues in the previously selected interrupt level.

16. The stored program computer system of claim 3 further comprising a plurality of selectable address translation registers containing bits for forming the high order portion of the address for addressing said main storage means beyond said portion, address translation register selection logic means responsive to high order bits of an address to generate signals for selecting one of said address translation registers, translate logic means responsive to the presence of said address translate mode to pass the high order address bits from the selected address translation register to address said main storage means together with the low order address bits from said addressing means and responsive to the absence of said address translate mode to pass the high order address bits from said addressing means to address said main storage means together with the low order address bits from said addressing means.

17. The stored program computer system of claim 16 wherein said address translation registers include bit positions for storing sets of fetch and write storage protection bits.

18. The stored program computer system of claim 1 further comprising means for generating a signal for storing the bits from a selected program mode register in said main storage means.

19. The stored program computer system of claim 1 further comprising means for generating a signal for setting bits from said main storage means into a selected program mode register.

20. The stored program computer system of claim 16 further comprising means for generating a signal for setting bits from said main storage means into a selected address translation register.

21. The stored program computer system of claim 16 further comprising means for generating a signal for storing bits from a selected address translation register in said main storage means.

22. The stored program computer system of claim 3 further comprising logic for generating a program check signal in the absence of a privileged operation mode in response to a privileged operation command.

* * * * *